United States Patent
Eschenbach

(12) 
(10) Patent No.: US 6,659,486 B2
(45) Date of Patent: Dec. 9, 2003

(54) EXERCISE SCOOTER

(76) Inventor: Paul William Eschenbach, 290 S. Tyger La., Roebuck, SC (US) 29376

( * ) Notice: Subject to any disclaimer, the term of this patent is extended or adjusted under 35 U.S.C. 154(b) by 0 days.

(21) Appl. No.: 09/895,572

(22) Filed: Jul. 2, 2001

(65) Prior Publication Data

US 2003/0001350 A1 Jan. 2, 2003

(51) Int. Cl.⁷ .................. B62M 1/00; B62D 61/06; B62C 1/00; A63B 69/16
(52) U.S. Cl. .................. 280/221; 280/62; 280/253; 280/87.05; 280/63; 482/57
(58) Field of Search .................. 280/63, 62, 87.041, 280/87.01, 202, 210, 220, 221, 223, 87.03, 87.05, 80.1, 252, 253, 255, 256, 257, 258, 259, 260, 261, 262, 263, 264, 247, 248; 74/594.3, 594.4; 482/51, 52, 57, 70, 72, 80

(56) References Cited

U.S. PATENT DOCUMENTS

| | | | |
|---|---|---|---|
| 1,273,906 A | | 7/1918 | Nickey |
| 1,323,004 A | | 11/1919 | Boyd |
| 1,799,947 A | * | 4/1931 | Benjamin .................. 280/221 |
| 1,800,123 A | * | 4/1931 | Wagen .................. 280/221 |
| 2,466,105 A | * | 4/1949 | Hoffman .................. 280/221 |
| 2,641,249 A | | 6/1953 | Brockman .................. 128/25 |
| 4,053,173 A | | 10/1977 | Chase .................. 280/253 |
| 4,379,566 A | | 4/1983 | Titcomb |
| 4,456,276 A | | 6/1984 | Bortolin |
| 4,561,318 A | | 12/1985 | Schirrmacher |
| 4,779,863 A | | 10/1988 | Yang |
| 4,821,832 A | * | 4/1989 | Patmont .................. 180/208 |
| 4,846,488 A | * | 7/1989 | Szadkowski .................. 280/221 |
| 5,207,442 A | * | 5/1993 | Gray et al. .................. 280/256 |
| 5,224,724 A | * | 7/1993 | Greenwood .................. 280/221 |
| 5,279,529 A | | 1/1994 | Eschenbach |
| 5,352,169 A | * | 10/1994 | Eschenbach .................. 482/57 |
| 5,470,089 A | * | 11/1995 | Whitson et al. ........ 280/87.041 |
| 5,527,246 A | | 6/1996 | Rodgers, Jr. |
| 5,611,758 A | | 3/1997 | Rodgers, Jr. |
| 5,630,774 A | | 5/1997 | Geschwender |
| 5,785,331 A | | 7/1998 | Rappaport ............. 280/87.041 |
| 5,836,854 A | * | 11/1998 | Kuo .................. 482/52 |
| 5,895,065 A | * | 4/1999 | Khomo .................. 280/221 |
| 5,899,474 A | | 5/1999 | Grutzik .................. 280/229 |
| 5,992,864 A | | 11/1999 | Dickson et al. ........ 280/87.041 |
| 6,077,198 A | * | 6/2000 | Eschenbach .................. 482/52 |
| 6,080,086 A | * | 6/2000 | Maresh et al. .................. 482/57 |
| 6,120,044 A | | 9/2000 | Tsai .................. 280/87.05 |
| 6,334,838 B1 | * | 1/2002 | Lee .................. 482/51 |
| 6,485,041 B1 | * | 11/2002 | Janssen .................. 280/221 |
| 6,557,880 B2 | * | 5/2003 | Drew .................. 280/259 |
| 2002/0077220 A1 | * | 6/2002 | Kuo .................. 482/51 |
| 2002/0151412 A1 | * | 10/2002 | Lee .................. 482/52 |
| 2003/0025293 A1 | * | 2/2003 | Drew .................. 280/253 |
| 2003/0040404 A1 | * | 2/2003 | Maresh .................. 482/51 |

FOREIGN PATENT DOCUMENTS

DE 003831220 A1 * 3/1990 .................. 280/228

* cited by examiner

Primary Examiner—Brian L. Johnson
Assistant Examiner—Gerald Klebe

(57) ABSTRACT

A compact exercise scooter supported by a pair of wheels is propelled by the cyclic operation of a pair of stabilized pedals by a standing user with hands on a handlebar. The elongate pedals are connected to a crank and guide for predetermined pedal angles configured to maintain heel contact during the cyclic operation. The feet are positioned on pedal extensions with the heels of the feet rearward of the crank pivots to develop superior crank torque imposed upon the wheels for faster speed and better startup acceleration. A means of adjustment is provided to change the predetermined pedal angles.

21 Claims, 3 Drawing Sheets

US 6,659,486 B2

EXERCISE SCOOTER

BACKGROUND OF THE INVENTION

1. Field of the Invention

The present invention relates to a human powered exercise scooter. More particularly, the invention allows a standing user to power the wheeled scooter by moving stabilized pedals with the feet along a closed loop arcuate curve to drive at least one wheel of the scooter. Further, steering and a hand brake are provided.

2. Description of the Prior Art

The traditional kick scooter comprises a pair of small wheels, steering and a platform to support at least one foot. Propulsion is achieved by pushing the scooter with one foot in contact with the ground while the other foot remains on the platform. While this type scooter is popular today among youngsters, the scooter is slow as a means of transport with a bumpy ride and tends to exercise one leg differently than the other. Whitson et al. in U.S. Pat. No. 5,470,089 shows a scooter having larger wheels to improve the speed and comfort of a kick scooter. Rappaport in U.S. Pat. No. 5,785,331 adds a second foot board to the kick scooter for better support. Grutzik in U.S. Pat. No. 5,899,474 shows a velocipede type scooter using an eccentrically mounted front wheel in an attempt to enhance kick propulsion of a scooter. Dickson in U.S. Pat. No. 5,992,864 shows a scooter having larger wheels adapted from a bicycle. Tsai in U.S. Pat. No. 6,120,044 offers a foldable rollerboard as a scooter variation. All of this prior art, uses kick propulsion.

Additional forms of human propulsion have also been tried for land transport. Chase in U.S. Pat. No. 4,053,173, Titcomb in U.S. Pat. No. 4,379,566, Bortolin in U.S. Pat. No. 4,456,276 and Schirrmacher in U.S. Pat. No. 4,561,318 use varying forms of up and down swing arms to propel scooters and bicycles.

The classic bicycle crank remains the most popular means to propel a bicycle for a seated user. However, freely rotating pedals do not provide sufficient support for standup only operation. The use of stabilized pedals as a means for propulsion start to appear with Boyd in U.S. Pat. No. 1,323,004 where a bicycle crank is adapted with an elongate pedal connected to the crank and to a rocker link pivoted at the rear of the bicycle for increased crank leverage.

Nickey in U.S. Pat. No 1,273,906 places the feet on a pair of elongate pedals connected to both a crank and a rocker link to drive a wagon. Yang in U.S. Pat. No. 4,779,863 shows a pair of pedals on a scooter type device that swing up and down to drive the front wheel. Geschwender in U.S. Pat. No. 5,630,774 offers an exercise apparatus similar to a scooter having three wheels and pedals connected to both a crank and a rocker link pivoted over the rear wheel. None of this prior art address a stabilized pedal for propulsion that fully supports the heel of the foot during operation.

Brockman in U.S. Pat. No. 2,641,249 offers a stationary exercise cycle having a pedal braced to foot and upper leg during seated exercise. Eschenbach in U.S. Pat. No. 5,279,529 shows stabilized pedal platforms that maintains heel support for standing exercise and proposes a variation for bicycle propulsion. Rodgers, Jr. in U.S. Pat. Nos. 5,527,246 and 5,611,758 shows a mobile exercise apparatus having a pedal supported by complex linkage to follow a running motion as a means for propulsion.

None of this prior art offers a means for scooter propulsion that enhances the circular movement of a crank and fully supports the feet of a standing operator. Hence, the need exists for an exercise scooter having stabilized pedals that fully support both feet of a standing operator and drive a crank to propel a wheel.

It is one objective of the present invention to provide stabilized pedals which follow a closed loop acruate curve that drives at least one wheel of an exercise scooter. Another objective of this invention is to provide full support for the foot during operation whereby the heel remains generally in contact with the pedal during movement. Another objective of this invention is to incorporate the same exercise for each leg as a natural function when using the scooter. Another objective of this invention is to provide adjustment whereby the pedal movement can be changed.

SUMMARY OF THE INVENTION

The present invention relates to the kinematic motion control of stabilized pedals to predetermine the angular position for each movement of the foot. More particularly, apparatus is provided that offers similar exercise for each leg through a leg operated cycle motion in which the pedal supporting each foot is guided through successive positions during the motion cycle while propelling a scooter.

The pedals are guided along a closed loop arcuate curve motion while pedal angles vary in a predetermined manner during the pedal cycle to maintain the heel of the foot generally in contact with the pedal. As the foot is raised, the heel of the foot remains generally in contact with the inclining pedal for more stable operation. When the foot is lowered during the power stroke, the heel remains in contact with the pedal to exert force on the pedal from the entire foot including the heel to drive the scooter. The foot of the user may be moved during operation to change leverage driving the scooter.

In the preferred embodiment, a frame capable of supporting a user is adapted for at least two wheels in contact with the ground. A first wheel is rotatably connected to a fork that is rotatably connected to the frame for steering. A handlebar extends upward from the fork to support the hands. The handlebar can be folded to lower the height of the scooter for stowage or transport. A second wheel is rotatably connected to the frame.

A crank is rotatably connected to the frame positioned adjacent the second wheel and protrudes on either side. The crank and second wheel are engaged with sprockets and a chain to form a drive coupling. A pair of foot support members having foot engaging pedals are pivotally connected to the crank. A pair of guides in the form of rocker links are pivotally connected to the frame positioned adjacent the first wheel. The other end of the foot support member is pivotally connected to the rocker link.

The rocker pivots are movably attached to the frame. A locking knob can be released to reposition the rocker pivots to change the predetermined pedal angles. A brake is adapted to the first wheel attached to the fork and connected to a brake lever on the handlebar by cable.

Application of alternating body weight on the stabilized pedals with the feet cause the crank to rotate and propel the second wheel with the drive coupling. Since the pedal angles are predetermined to maintain the heel upon the pedals, full body weight can safely be applied to the pedals for efficient power transfer to the second wheel.

In an alternate embodiment, foot support members are connected to the crank intermediate the ends. The rocker link guide is replaced with a track adjustably attached to the frame. A roller is rollably connected to a pedal extension and is in rollable contact with the track. An elongate pedal extending on either side of the crank pivot is attached to the foot support member. Frame, wheels, coupling, handlebar, brake and fork are similar to the preferred embodiment.

Application of body weight on the elongate pedal portion overhanging the crank pivot adds leverage to the power stroke for increased force exerted upon the crank for better acceleration of the scooter or for riding uphill. Once cruising speed has been reached, the feet may be repositioned more forward for easy pedaling to maintain speed.

Coasting with either embodiment is comfortable when the pedals are positioned generally parallel to allow support for each foot. A one way clutch in the second wheel allows the pedals to be reversed to the coasting mode or positioned for easy starting.

In summary, this invention provides the user with stable pedal operation with little or no impact to the body to propel a scooter. Because heel contact is maintained, operation is safer and body weight is efficiently transferred into torque to drive the second wheel up to attractive land speeds.

DETAILED DESCRIPTION OF THE EMBODIMENTS

Figure 1:
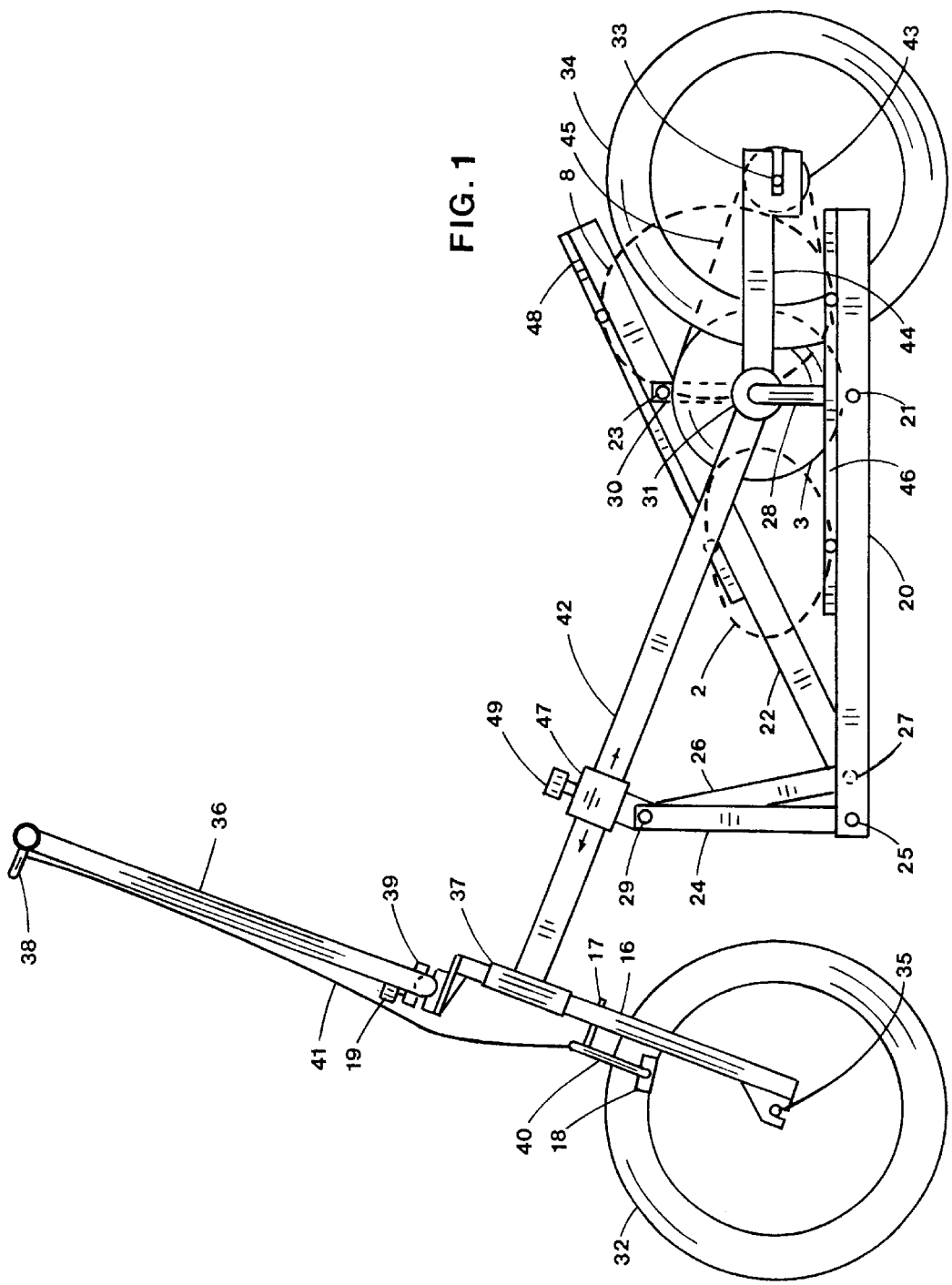
FIG. 1 is a left side elevation of the preferred embodiment of an exercise scooter constructed in accordance with the present invention with pedals, in the highest and lowest positions.
Figure 2:
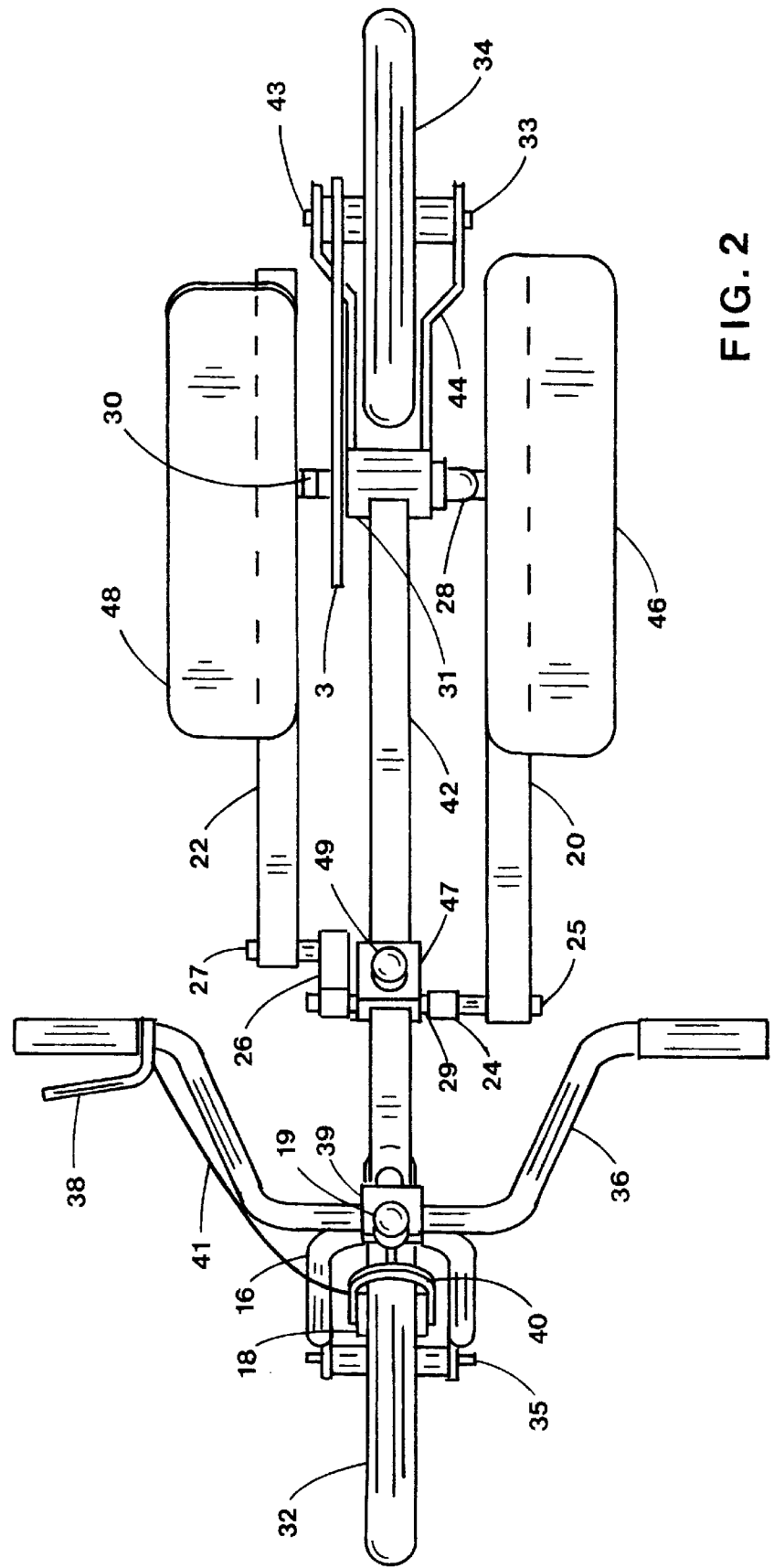
FIG. 2 is a plan view of the preferred embodiment shown in FIG. 1.

Referring to the drawings in detail, pedals 46,48 are shown in FIGS. 1 and 2 in generally their highest and lowest positions of the preferred embodiment. Pedals 46,48 are supported by foot support members 20,22. Cranks 28,30 are maintained generally 180 degrees apart and are rotatably connected to crank housing 31. Foot support members 20,22 are connected at one end to cranks 28,30 at pivots 21,23 and to rocker links 24,26 at pivots 25,27. Pivot collar 47 and locking knob 49 are movably connected to frame member 42 and to rocker links 24,26 at pivot 29. Moving pivot collar 47 along frame member 42 to a different position changes the predetermined angles of pedals 46,48.

First wheel 32 is rotatably connected to fork 16 at axle 35. Fork 16 is rotatably connected to fork housing 37 to accommodate steering. Knob 19 locks clamp 39 to secure handlebar 36 to fork 16. When knob 19 is loosened, handlebar 36 may be rotated about clamp 39 to be folded down for stowage.

Second wheel 34 is rotatably connected to frame member 44 by axle 33. Sprocket 43 is connected to wheel 34 with a one-way clutch (not shown). Sprocket 3 is attached to cranks 28,30 and is engaged with sprocket 43 by chain 45. Frame members 42 and 44 are attached to crank housing 31 and fork housing 37. Application of body weight on pedals 46,48, cause the pedals 46,48 to follow the closed loop arcuate curves 2 and 8 with associated predetermined pedal angles. The foot of the user may be moved during operation to vary leverage imposed upon the crank between curves 2 and 8.

A comparison of the torque developed on the crank 28,30 with the heel of the foot of a user following curve 2 versus curve 8 follows. For a 3" crank 28 and 13.5" between Divots 21 and 25, a 100 lb user weight following curve 2 will develop approximately a maximum of 108 in-lb of crank 28 torque during the down stroke of pedal 46. By placing the heel of the foot on the pedal 46 extension rearward crank pivot 21, the crank 28 torque increases to 400 in-lb during the downward cower stroke of pedal 46 when the heel of the foot follows curve 8. This nearly 4/1 increase in crank 28 torque allows the use of a large crank sprocket 3 relative to the driven sprocket 43 to achieve much faster speed than scooters using other propulsion systems shown in prior art. The higher crank 28 torque occurs independent of longer or shorter legs of the user.

Brake arm 40 and brake calipers 18 are connected to fork 16 at pivot 17. Hand lever 38 is mounted to handlebar 36 and connected to brake arm 40 by cable 41. It is obvious that a second brake (not shown) can be added to second wheel 34.

Figure 3:
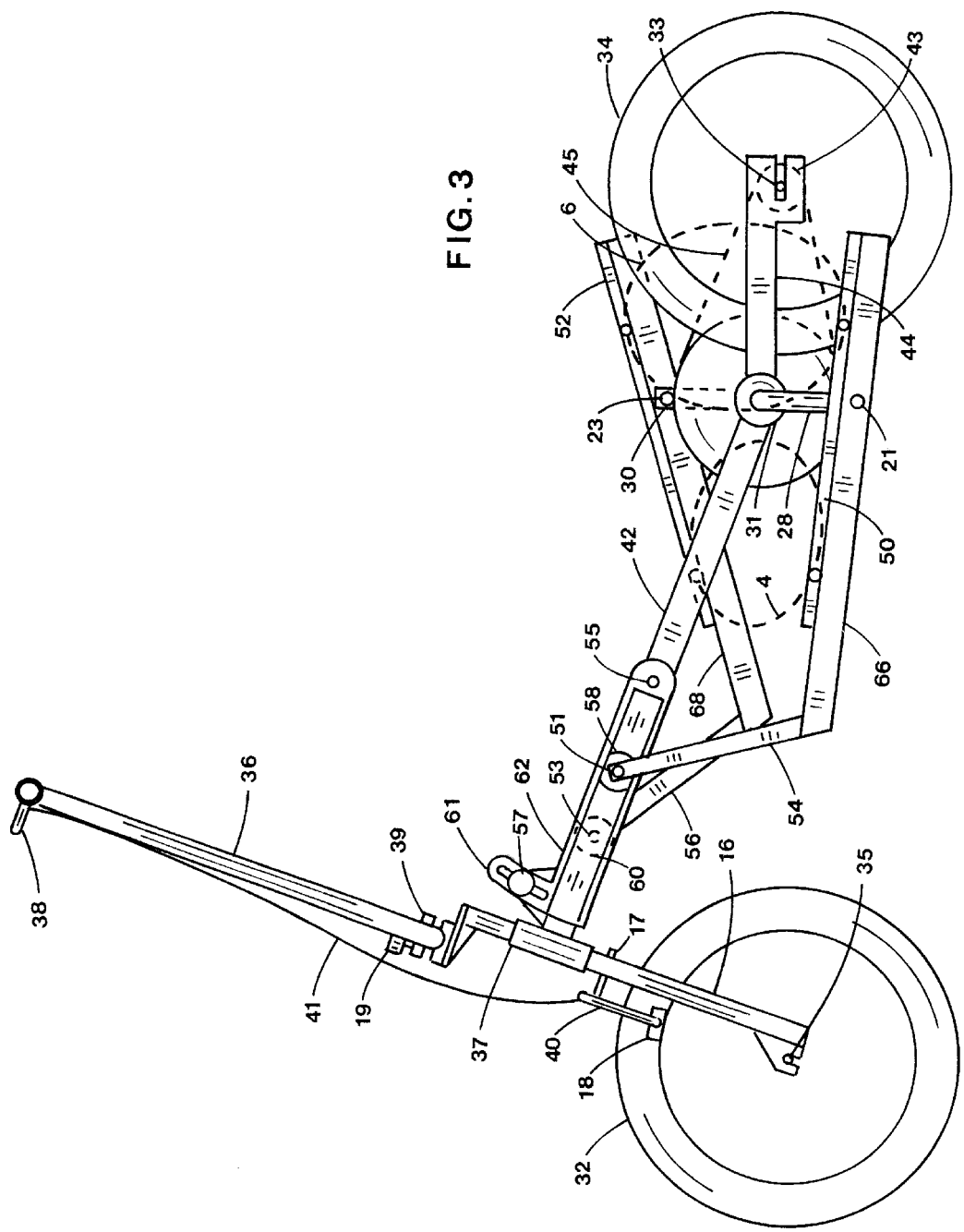
FIG. 3 is a side elevation view of an alternate embodiment with pedals in the highest and lowest positions.

In the alternative embodiment, elongate pedals 50,52 are shown in FIG. 3 in their highest and lowest positions. Elongate pedals 50,52 are attached to foot support members 66,68 which have foot support extensions 54,56 extending upward from foot support members 66,68. Crank pivots 21,23 are positioned intermediate the ends of foot support members 66,68.

Rollers 58,60 are rollably connected to foot support extensions 54,56 at pivots 51,53. Rollers 58,60 are in rollable contact with tracks 62,64 which are adjustably connected to frame member 42 at pivot 55. Adjustment bracket 61 is attached to tracks 62,64 and is secured to frame member 42 by locking knob 57. Knob 57 may be loosened to reposition tracks 62,64 to change the predetermined angles of elongate pedals 50,52.

When the feet are positioned on the portion of elongate pedals 50,52 that overhangs pivots 21,23, the feet follow closed loop arcuate curve 6 which provides additional leverage causing more torque on cranks 28,30 to pull a hill or to achieve better acceleration of the scooter. Once cruising speed is reached, the feet can be repositioned on elongate pedals 50,52 between pivots 21,23 and and foot support extensions 54,56 for easier pedaling along closed loop arcuate curve 4. The remainder of the alternate embodiment is similar to the preferred embodiment.

The present invention may be embodied in other specific forms without departing from its spirit or essential characteristics. The described embodiments are to be considered in all respects only as illustrative, and not restrictive. The scope of the invention is, therefore, indicated by the claims, rather than by foregoing description. All changes which come within the meaning and range of equivalency of the claims are to be embraced within their scope.

What is claimed is:

1. An exercise scooter configured for standup operation comprising:

a frame, said frame capable of supporting a user;

a first wheel, said first wheel in contact with a supporting surface and operably associated with said frame for steering said exercise scooter;

a second wheel, said second wheel rotatably connected to said frame and in contact with said supporting surface;

a crank, said crank positioned adjacent said second wheel and rotatably connected to said frame protruding on either side;

a drive coupling, said drive coupling operably associated with said crank and said second wheel;

a pair of guides, each said guide operably associated with said frame positioned adjacent said first wheel;

a pair of foot support members having foot engaging pedals, each said foot support member pivotally connected to said crank at a crank pivot and pivotally connected to said respective guide at a guide pivot wherein the distance from said guide pivot to said crank pivot does not change to predetermine the angular position of said foot support member for each position of said crank;

a guide adjustment, said guide adjustment movable to change said angular position of each of said foot support member relative to said frame;

said pedal positioned upon said foot support member adjacent said crank pivot;

said pedal configured to move relative to said frame when the foot of said user is rotating said crank whereby, said crank causes rotation of said second wheel to propel said exercise scooter.

2. The exercise scooter according to claim 1 further comprising a fork, said fork rotatably connected to said first wheel and said frame for steering said exercise scooter.

3. The exercise scooter according to claim 2 further comprising a handle bar, said handlebar attached to said fork to support the hands of said user.

4. The exercise scooter according to claim 3 further comprising a brake, said brake operably associated with said handlebar and at least one wheel.

5. The exercise scooter according to claim 1 wherein each said guide comprises a rocker link, each said rocker link pivotally connected to respective said foot support member at said guide pivot and to said guide adjustment.

6. The exercise scooter according to claim 1 wherein said guide adjustment comprises a pivot collar, said pivot collar movably connected to said frame and pivotally connected to said guides whereby said predetermined angular positions of said pedals can be changed.

7. The exercise scooter according to claim 1 wherein said drive coupling comprises a pair of sprockets, one sprocket secured to said crank and the other sprocket secured to said second wheel and where said sprockets are engaged by a chain.

8. The exercise scooter according to claim 1 wherein said pedals are elongated to extend on either side of the crank pivot whereby the foot can be moved with the heel of the foot remaining adjacent to said crank pivot during operation to change the leverage imposed upon said crank.

9. A scooter for user propulsion comprising:

at least two wheels, said wheels in contact with a supporting surface to support said scooter and having at least one driven wheel;

a frame, said frame configured to connect said wheels and support a user;

a crank, said crank having a crank axis positioned adjoining said driven wheel and rotatably connected to said frame protruding on either side having a pair of crank pivots;

a pair of guides, each said guide operably associated with said frame and each having a guide pivot;

a pair of pedals stabilized for user support, each said pedal connected to a corresponding said crank pivot and a corresponding said guide pivot wherein the distance from said guide pivot to said crank pivot does not change, and each said pedal operably associated with said frame for both up and down as well as back and forth movement, and having a predetermined pedal angle for each foot position;

said pedal configured to position the heel of the foot of said user rearward said crank pivot;

said pedal configured to move relative to said frame when the foot of said user exerts force upon said pedal whereby said pedal movement causes rotation of said wheels while said heel of said foot generally maintains contact with said pedal during said pedal movement to follow a generally vertical elongated heel curve relative to said frame positioned generally rearward of said crank axis to develop increased crank torque.

10. The scooter according to claim 9 wherein each said guide is a rocker link pivotally connected to said guide pivot and pivotally connected with said frame.

11. The scooter according to claim 9 further comprising a means for adjustment, said means for adjustment operably associated with each said guide and said frame to change said predetermined pedal angles.

12. The scooter according to claim 9 further comprising a fork, said fork rotatably connected to one of said wheels and said frame for steering said scooter.

13. The scooter according to claim 12 further comprising a handlebar, said handlebar attached to said fork to support the hands of said user.

14. The scooter according to claim 13 further comprising a clamp, said clamp having a knob whereby said knob can be loosened such that said handlebar can be folded for stowage.

15. The scooter according to claim 14 further comprising a brake, said brake operably associated with said handlebar and at least one wheel.

16. A method of exercising on a scooter of the type having a frame supported by a pair of wheels, a handlebar to steer one of the wheels, left and right cranks supported by the frame and rotatable relative thereto about a common crank axis positioned adjoining the other wheel, and left and right foot supporting members having respective intermediate portions connected to respective cranks at a crank pivot and respective forward ends supported by right and left guide pivots positioned adjacent the steering wheel to the frame in reciprocal fashion relative thereto, wherein rotation of the cranks does not change the distance between the crank pivot and guide pivot on the right and left foot supporting members and the crank rotation is linked to propulsion of a wheel, comprising the steps of:

an adjustment to select the guide path of the right and left guide pivots prior to riding;

standing with a respective foot on each foot supporting member with the heel of the foot of a user positioned rearward to the crank pivot to develop increased crank torque;

steering one of the wheels with the handlebar;

moving the foot supporting members through a closed loop vertically elongated heel path positioned generally rearward of the crank axis relative to the frame to propel the other wheel; moving the scooter relative to a supporting surface.

17. An exercise scooter comprising:

a frame, said frame capable of supporting a user;

a first wheel, said first wheel in contact with a supporting surface and operably associated with said frame for steering said exercise scooter;

a second wheel, said second wheel rotatably connected to said frame and in contact with said supporting surface;

a crank housing positioned adjacent to said second wheel and operably connected to said frame, said crank housing having first and second cranks with each said crank having a crank pivot;

a drive coupling, said drive coupling operably associated with said crank housing and said second wheel;

a pair of guides, each said guide having a first end and a second end, said first end of each guide operably associated with said frame and positioned adjacent to said first wheel; said second end of each guide extending substantially downward from said frame;

a pair of foot support members, each said foot support member having first end, a second end and an intermediary portion adjacent to said second end; said first end of each foot Support member pivotably connected to said second end of each respective guide at a guide pivot, said intermediary portion of each foot support member pivotally connected to said respective crank at said crank pivot wherein the distance from said guide pivot to said crank pivot does not change whereby said second and of each said foot support member follows a generally vertical elongated curve positioned generally rearward of said crank housing relative to said frame.

18. The exercise scooter of claim 17 wherein each said foot support member has a respective foot engaging pedal.

19. The exercise scooter of claim 18 wherein a portion of each said pedal extends rearward of said crank housing.

20. The exercise scooter of claim 19 herein each said pedal supports a user's feet and the user's heels generally maintain contact with each said pedal when the user exerts force on each said pedal.

21. The exercise scooter of claim 12 wherein each said guide comprises a rocker link.

* * * * *